(12) United States Patent  (10) Patent No.: US 8,306,385 B2
Hino et al.  (45) Date of Patent: Nov. 6, 2012

(54) RECORDING APPARATUS AND MOUNT CONTROL METHOD

(75) Inventors: Takeharu Hino, Kanagawa (JP); Katsuyuki Fujihata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1747 days.

(21) Appl. No.: 11/395,207

(22) Filed: Apr. 3, 2006

(65) Prior Publication Data

US 2006/0233515 A1  Oct. 19, 2006

(30) Foreign Application Priority Data

Apr. 15, 2005  (JP) ................................. 2005-118950

(51) Int. Cl.
*H04N 5/77*  (2006.01)
*H04N 9/68*  (2006.01)

(52) U.S. Cl. ........................................ 386/224; 386/314

(58) Field of Classification Search ................... 386/124
See application file for complete search history.

(56) References Cited

U.S. PATENT DOCUMENTS

| 5,832,213 | A | 11/1998 | Duncan | |
|---|---|---|---|---|
| 6,868,429 | B2 | 3/2005 | Fontijn | |
| 2001/0019420 | A1* | 9/2001 | Sanbongi et al. | 358/1.15 |
| 2003/0028508 | A1* | 2/2003 | Quinlan | 707/1 |
| 2004/0246359 | A1* | 12/2004 | Ogino et al. | 348/333.01 |
| 2005/0021880 | A1* | 1/2005 | Robbin et al. | 710/15 |
| 2005/0060491 | A1* | 3/2005 | Ayaki | 711/115 |

FOREIGN PATENT DOCUMENTS

| JP | H09-65271 | 3/1997 |
|---|---|---|
| JP | H11-213625 | 8/1999 |
| JP | 2002-238027 | 8/2002 |
| JP | 2003-242459 | 8/2003 |
| JP | 2003-271434 | 9/2003 |
| JP | 2005-85008 | 3/2005 |
| JP | 2005-92523 | 4/2005 |

OTHER PUBLICATIONS

Tetsuji Sekiguchi, CF type memory card is usable with CLIE! Compact Flash Storage Card Driver, Mobile Press, Gijutsu Hyoronsha Co., Ltd., Aug. 24, 2003, vol. 3, No. 3, pp. 230-231.
Mark Comarinski, Carry Collet, Kernel, 2.2 Auto mounting, Linux World, Preservation version second, IDG communications Co., Ltd., Sep. 1, 1999, pp. 62-67.

* cited by examiner

*Primary Examiner* — William C Vaughn, Jr.
*Assistant Examiner* — Asher Khan
(74) *Attorney, Agent, or Firm* — Oblon, Spivak, McClelland, Maier & Neustadt, L.L.P.

(57) ABSTRACT

The present invention prevents data stored in memory cards from being damaged while maintaining the operability of inserting and ejecting memory cards. A device has a connection section to which a memory card 11 is connected. The memory card 11 is different from an optical disc 10 on which image data are recorded. The device checks whether the memory card 11 is connected to the connection section. When the device starts performing certain processes to the memory card 11 after detecting that the memory card 11 is connected, the device performs mount processes. When the device stops performing the certain processes, the device immediately performs unmount processes to the memory card 11. The memory card 11 is unmounted while the device is not performing the certain processes. Unmounting the memory card 11 prevents data stored in the memory card 11 from being damaged even if a user accidentally ejects it.

7 Claims, 6 Drawing Sheets

RECORDING APPARATUS AND MOUNT CONTROL METHOD

CROSS REFERENCES TO RELATED APPLICATIONS

The present invention contains subject matter related to Japanese Patent Application JP2005-118950 filed in the Japanese Patent Office on Apr. 15, 2005, the entire contents of which being incorporated herein by reference.

BACKGROUND OF THE INVENTION

1. Field of the Invention

The preset invention relates to a recording apparatus and mount-control method, and is preferably applied to a video camera (also referred to as a "camcorder") for broadcast stations, for example.

2. Description of Related Art

A camcorder used in broadcast stations utilizes an optical disc, such as randomly accessible Digital Versatile Disc (DVD), to record. The camcorder controls a Charge Coupled Device (CCD) camera to take for example pictures of materials and transforms them to main-line video data and the like. The camcorder then records the main-line video data and the like on the optical disc.

At the same time, the camcorder records on the optical disc audio signals corresponding to the main-line video data; representative-images video data (also referred to as "proxy image data"), which are reference pictures generated based on the main-line video data; and metadata, which include shooting date and time, equipment information and conditions, in addition to the main-line video data taken by the CCD camera.

This kind of camcorder may require accurate setting of color matching and the like before shooting. In this case, the camcorder reads out various kinds of configuration information relevant to the color matching and the like from a memory card via a memory card adapter. The camcorder then follows the configuration information to adjust the color matching and the like.

In this manner, the camcorder reads out the configuration information from the memory card. The camcorder is designed to easily insert and eject the memory card. For example, the memory card is connected to a connection section in a camera main unit of the camcorder just by inserting the memory card through the memory card adapter. The memory card is disconnected from the connection section of the camcorder just by ejecting the memory card from the memory card adapter.

SUMMARY OF THE INVENTION

When the memory card is connected to the connection section of the camera main unit, the camcorder performs a mount process to recognize this memory card as a new device connected to the camera main unit such that the camcorder can utilize the memory card. As noted above, it is easy to eject the memory card from the camera main unit, and therefore there is a possibility that the memory card is accidentally ejected by users while the memory card is being mounted. This may damage data stored in the memory card.

The present invention has been made in view of the above points and is intended to provide a recording apparatus and mount-control method which can prevent data stored in a data storage medium from being damaged while maintaining the operability of inserting and ejecting the data storage medium.

In an embodiment of the present invention, a recording apparatus including: a drive section for driving a recording medium on which image data is recorded; a connection section for connecting to a data storage medium, the data storage medium being different from the recording medium; and a control section for performing mount process and unmount process to the data storage medium while the data storage medium is being connected to the connection section, wherein the control section performs the mount process at a time when the data storage medium is connected to the connection section, performs the unmount process after reading out a part of data from the data storage medium, and performs the mount process when a process of recording the image data on the recording medium starts.

In addition, a mount control method including: a connection disconnection check step of checking whether or not a data storage medium is connected to a connection section, the data storage medium being different from a recording medium on which image data is recorded; a first mount process step of performing mount process to the data storage medium when detecting that the data storage medium is connected; an unmount process step of performing unmount process to the data storage medium immediately after reading out a part of data from the data storage medium; and a second mount process step of performing the mount process again when a process of recording the image data on the recording medium starts.

In this manner, while the apparatus is performing certain processes, the data storage medium is mounted. When the apparatus stops performing the certain processes, the data storage medium is unmounted even if it is still connected. Unmounting the data storage medium prevents data stored in the data storage medium from being damaged even if a user accidentally ejects the data storage medium. This ensures the reliability of data stored in memory cards. Therefore, video cameras and the mount control method can prevent data stored in memory cards from being damaged while maintaining the operability of inserting and ejecting the memory cards.

The nature, principle and utility of the present invention will become more apparent from the following detailed description when read in conjunction with the accompanying drawings in which like parts are designated by like reference numerals or characters.

DETAILED DESCRIPTION OF PREFERRED EMBODIMENTS

An embodiment of the present invention will be described in detail with reference to the accompanying drawings.

(1) Overall Configuration of Disc Camcorder

Figure 1:
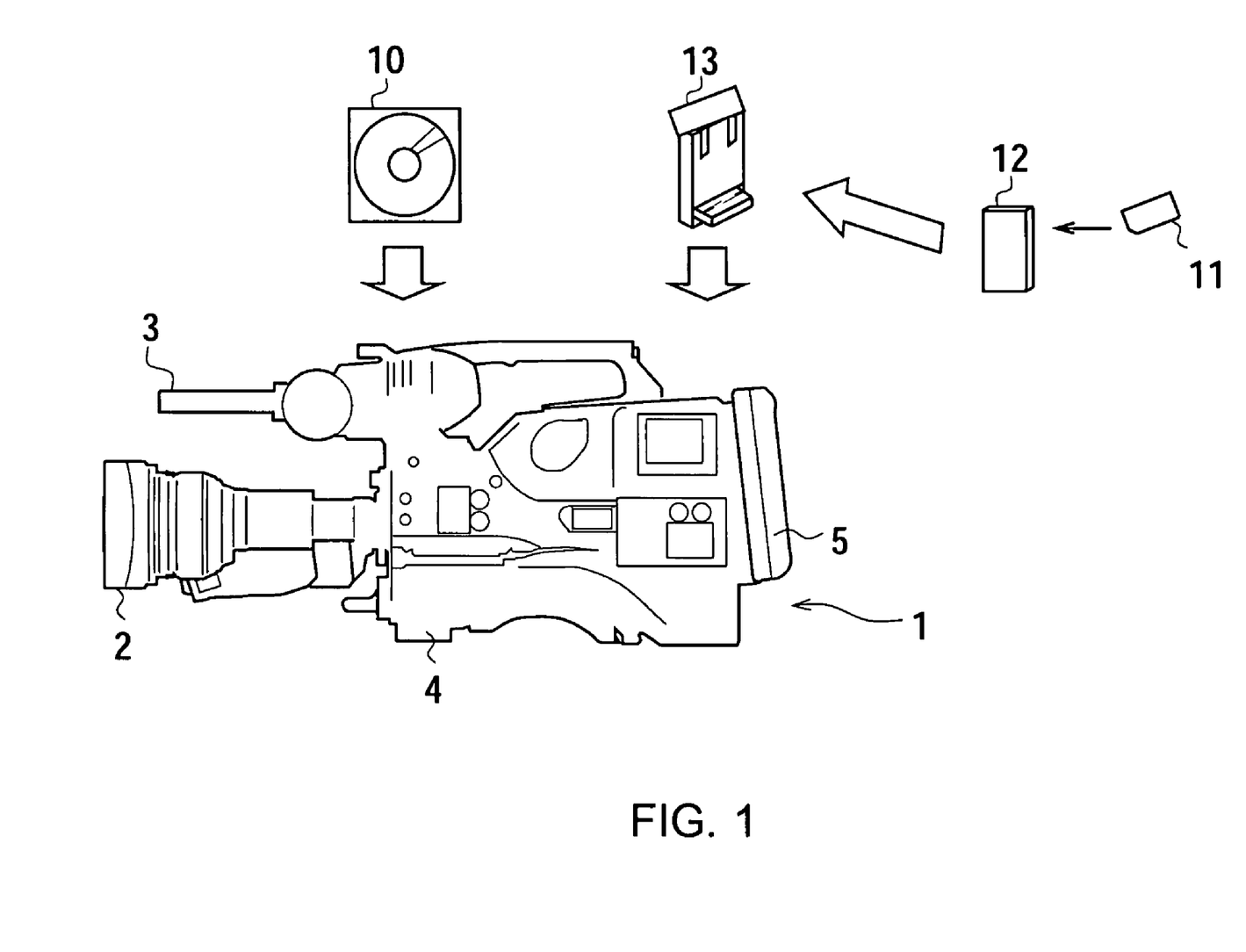
FIG. 1 is a schematic diagram showing the overall configuration of a disc camcorder.

In FIG. 1, the reference numeral 1 represents a disc camcorder as a whole. The disc camcorder 1 utilizes a disc recording medium. The disc camcorder 1 is powered by a battery 5 to control a camera main unit 4, a CCD camera 2 and a microphone 3. The disc camcorder 1 controls the CCD camera 2 to take pictures of materials and transforms them to main-line video data. The disc camcorder 1 also controls the microphone 3 to pick up sounds and transforms them to audio data. The disc camcorder 1 then records the main-line video data and the audio data on an optical disc 10. The optical disc 10, main-line recording medium, is for example equivalent to a removable DVD.

A memory card 11, such as "MEMORY STICK (Registered Trademark of Sony Corporation)", is inserted into a multi Personal Computer (PC) card adapter 12 which is then placed in a camcorder adapter 13. This camcorder adapter 13 is connected to a connection section (not shown) of the disc camcorder 1, which is disposed at a certain position of the camera main unit 4. In this manner, the camcorder adapter 13 with the memory card 11 can be connected and disconnected by users. When the memory card 11 is connected to the connection section, the disc camcorder 1 can interchange data with the memory card 11.

The disc camcorder 1 records different data on the optical disc 10 and the memory card 11. In the disc camcorder 1, the main-line video data are recorded on the optical disc 10, while other data are recorded on the memory card 11 as described below.

(2) Circuit Configuration of Disc Camcorder

Figure 2:
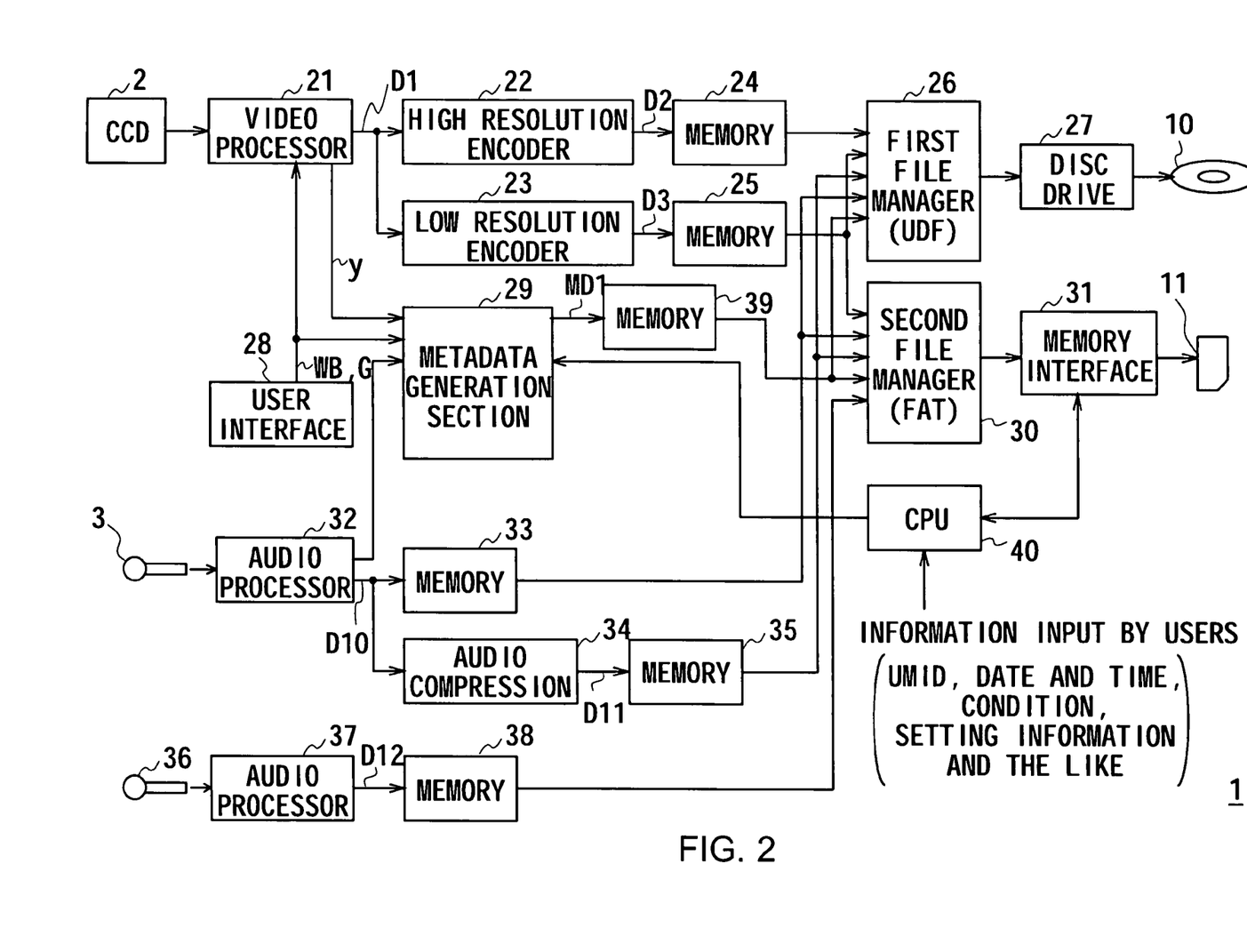
FIG. 2 is a schematic block diagram showing the circuit configuration of the disc camcorder.

As shown in FIG. 2, a CPU 40 takes overall control of the disc camcorder 1. The CCD camera 2 takes pictures of object and transforms them to electronic signals. The CCD camera 2 then supplies the electronic signals to a video processor 21.

The video processor 21 performs analog-to-digital conversion for the electronic signals to generate material data D1. The video processor 21 then supplies the material data D1 to a high resolution encoder 22 and a low resolution encoder 23.

The high resolution encoder 22 compresses and encodes the material data D1 in Moving Picture Experts Group (MPEG)-IMX format, which is in accord with MPEG2 standard. As a result, the high resolution encoder 22 generates high-resolution coded data (30 Mbps, 40 Mbps or 50 Mbps) D2. The high-resolution coded data D2 is also referred to as "main-line video data." The high resolution encoder 22 then supplies the main-line video data D2 to a first file manager 26 via a memory 24.

The low resolution encoder 23, which operates in accord with MPEG 4 standard, compresses and encodes the material data D1 to low-resolution coded data (also referred to as "proxy image data") D3 whose resolution is lower than data generated by the high resolution encoder 22. The low resolution encoder 23 then supplies the proxy image data D3 to the first file manager 26 and a second file manager 30 via a memory 25.

The microphone 3 collects sounds and transforms them to audio signals. The microphone 3 then supplies the audio signals to an audio processor 32. The audio processor 32 performs analog-to-digital conversion for the analog signals to generate audio data D10 with the sampling frequency of 48 KHz and 16-bit or 24-bit resolution. The audio processor 32 subsequently supplies the audio data D10 to an audio compression circuit 34.

The audio compression circuit 34 compresses and encodes the audio data D10 in a format called Alaw, which is in accord with a standard of audio compression on the Internet. As a result, the audio compression circuit 34 generates 8-bit compressed audio data D11, and then supplies the compressed audio data D11 to the first file manager 26 and the second file manager 30 via a memory 35. The uncompressed audio data D10 is also supplied to the first file manager 26 and the second file manager 30 via a memory 33.

The user interface 28 can adjust the video processor 21 to change the qualities of the material data D1, such as the white balance WB and gain G of the material data D1. When the white balance WB and the gain G is adjusted, the metadata generation section 29 is notified by the user interface 28 accordingly.

If the luminance level Y of the material data D1 changes, the video processor 21 notifies the metadata generation section 29 accordingly. When the level of the audio data D10 exceeds a predetermined value, the audio processor 32 notifies the metadata generation section 29 that the audio data D10 has exceeded a predetermined level.

Information about shooting date and time, condition and equipment are input by users. Other setting information and Unique Material Identifier (UMID) are also input by users. The CPU 40 supplies to the metadata generation section 29 the information input by users.

The UMID is standardized in Society of Motion Picture and Television Engineers (SMPTE) 330M. The UMID, a globally unique identifier, is used to identify audio-visual materials and the like. In this case, the UMID is used to identify the high-resolution main-line video data D2 on the optical disc 10.

For example, the disc camcorder 1 manages the main-line video data D2 by storing the main-line video data D2 in a certain place (i.e. directory). In this case, cameraman utilizes the UMID to identify the main-line video data D2 wherever the main-line video data D2 are stored. Therefore, the cameraman can specify his/her desired main-line video data D2 wherever they are stored. Note that it is desirable to recognize relationship between directories where the main-line video data D2 are stored and corresponding UMIDs.

The metadata generation section 29 recognizes the following events and information to generate metadata MD1 for each video material: changes of the white balance WB, gain G and luminance level Y; information notifying that the audio data D10 has exceeded the predetermined level; information about shooting date and time, condition and equipment; various setting information; and UMID. The metadata generation section 29 then supplies the metadata MD1 to the first file manager 26 and the second file manager 30 via a memory 39.

The first file manager 26 utilizes a file system know as Universal Disk Format (UDF). The first file manager 26 transforms the main-line video data D2, which are supplied through the memory 24, to files in accord with the UDF. The first file manager 26 also recognizes the order of the main-line video data D2 using the directory structure of UDF. The disc drive 27 records on the optical disc 10 the main-line video data D2 in that order.

In addition, the first file manager 26 recognizes the order of the proxy image data D3, which are supplied through the memory 25, using the directory structure of UDF. The disc drive 27 records on the optical disc 10 the proxy image data D3 in that order. Further, the first file manager 26 recognizes the order of the audio data D10, which are supplied through the memory 33, using the directory structure of UDF. The disc drive 27 records on the optical disc 10 the audio data D10 in that order. Furthermore, the first file manager 26 recognizes the order of the compressed audio data D11, which are supplied through the memory 35, using the directory structure of UDF. The disc drive 27 records on the optical disc 10 the compressed audio data D11 in that order.

The first file manager 26 also transforms the metadata MD1, which are supplied through the memory 39, to files in accord with the UDF, and recodes the files on the optical disc 10 through the disc drive 27.

The second file manager 30 utilizes a file system know as File Allocation Table (FAT), which is used in "Microsoft Disk Operating System (MS-DOS)/Windows (Registered Trademark)", so that personal computers can process data stored in the memory card 11. Therefore, both the disc camcorder 1 and general-purpose computers can support the memory card 11.

The second file manager 30 receives all data except the main-line video data D2. That is to say, the second file manager 30 receives the proxy image data D3, the audio data D10, the compressed audio data D11 and the metadata MD1. The second file manager 30 then stores the received data in the memory card 11 through a memory interface 31 in accordance with the FAT.

A cameraman's microphone 36 is used for voice memo. If cameraman who is shooting says something, the cameraman's microphone 36 picks up these sounds, while the microphone 3 is collecting the audio data D10 corresponding to the material data D1. The cameraman's microphone 36 then transforms the sounds to audio data, and supplies the audio data to an audio processor 37.

The audio processor 37 performs analog-to-digital conversion for the audio data to generate voice memo data D12. The audio processor 37 subsequently supplies the voice memo data D12 to the second file manager 30 through a memory 38.

The second file manager 30 stores the voice memo data D12 in the memory card 11 via the memory interface 31 in accordance with the FAT. The voice memo data D12 are associated with the main-line video data D2 by the UMID.

Figure 3:
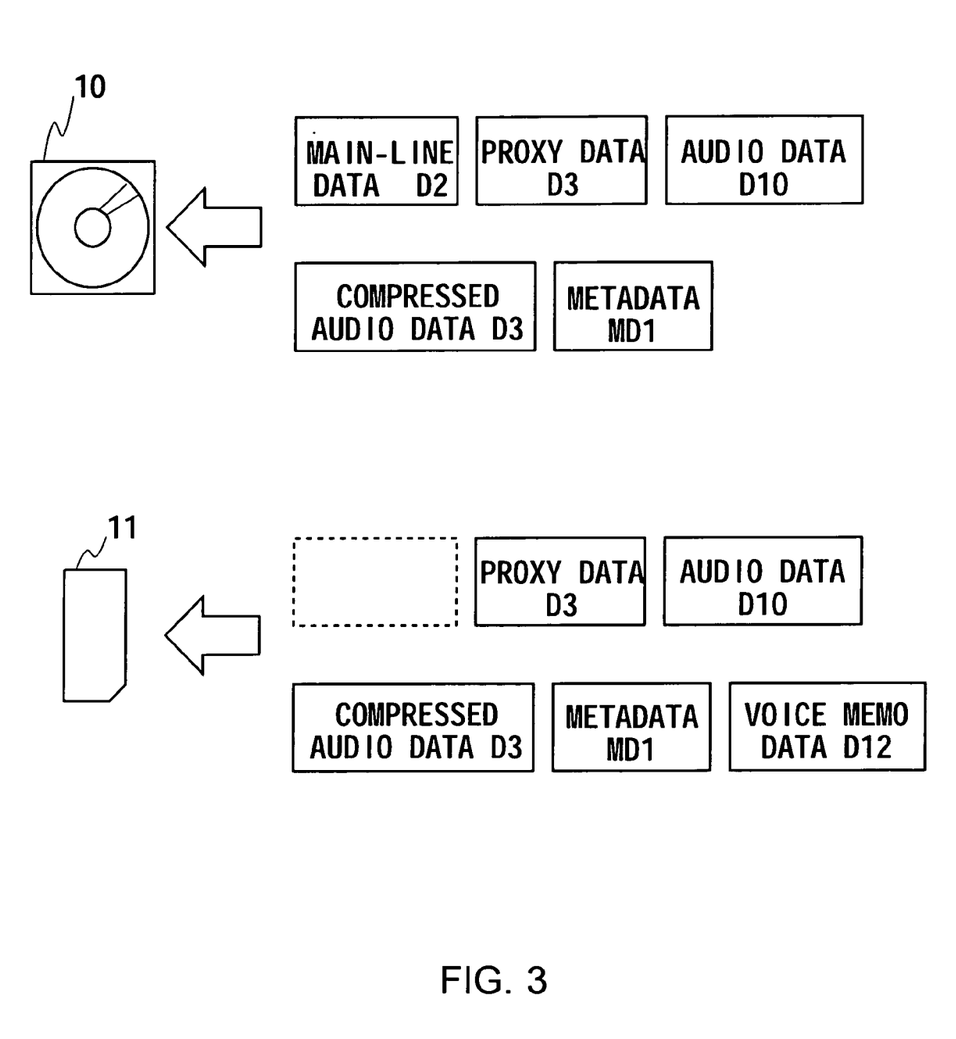
FIG. 3 is a schematic diagram illustrating difference between an optical disc and a memory card in terms of storing data.

In this way, the disc camcorder 1 records all the data (including the high-resolution main-line video data D2 generated based on the material data D1) on the removable optical disc 10, as shown in FIG. 3. The disc camcorder 1 records all the data except the high-resolution main-line video data D2 on the removable memory card 11.

(3) Mount-Control Process

Figure 4:
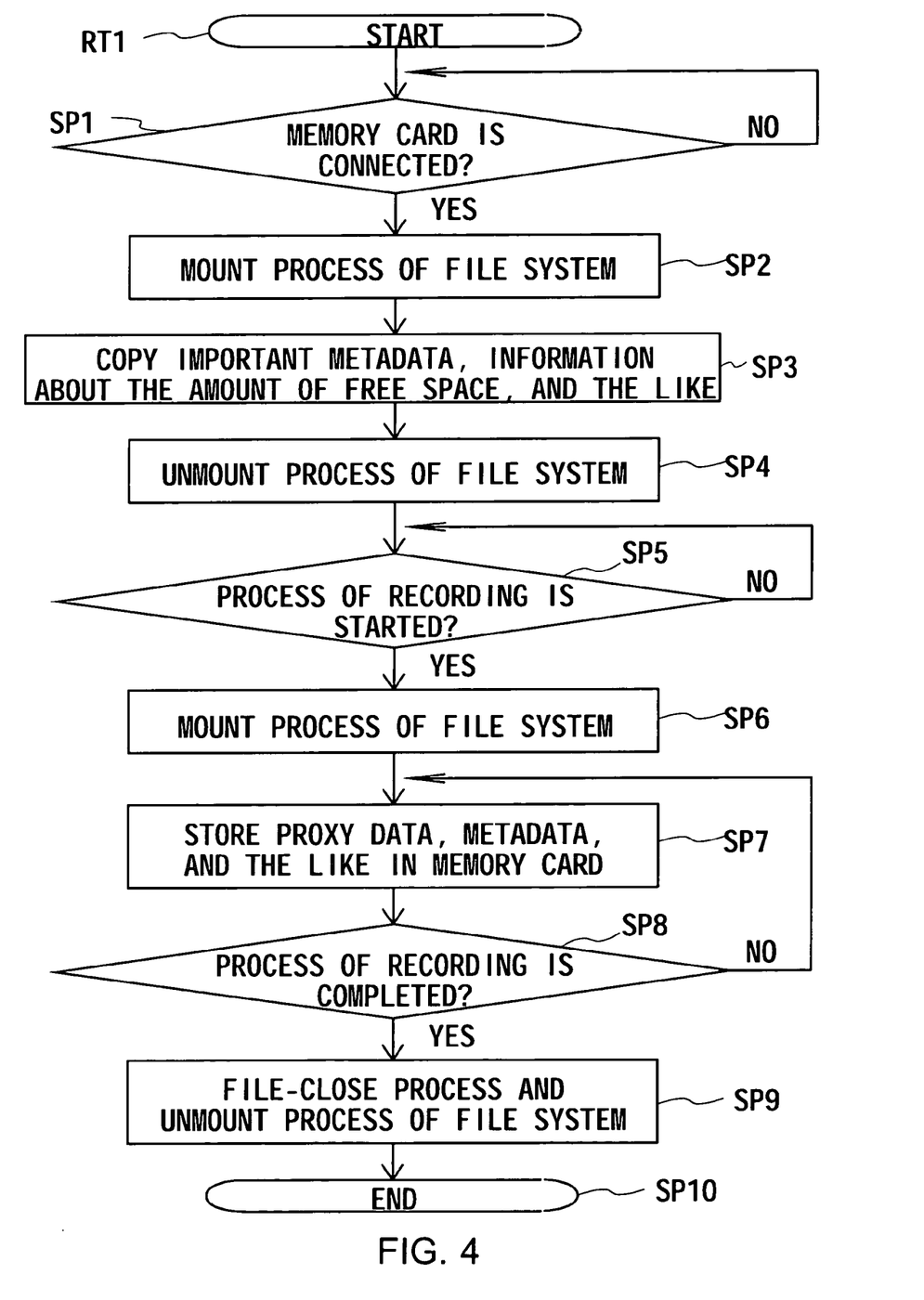
FIG. 4 is a flowchart illustrating a mount-control process.

The disc camcorder 1 performs a mount-control process for the memory card 11 connected to the camera main unit 4. With reference to FIG. 4 (flowchart), the mount-control process will be described below.

The CPU 40 of the disc camcorder 1 starts the mount-control process from start step of a routine RT1, and then proceeds to step SP1. At step SP1, based on detection signals supplied from the memory card interface 31 (FIG. 2), the CPU 40 checks whether or not the memory card 11 is connected to the camera main unit 4 via the camcorder adapter 13.

Negative result at step SP1 means that the memory card 11 is not connected to the camera main unit 4. In this case, the CPU 40 of the disc camcorder 1 remains at step SP1 until the memory card 11 is connected to the camera main unit 4. If affirmative result is obtained at step SP1, the CPU 40 proceeds to next step SP2.

Since the memory card 11 is connected to the camera main unit 4, the CPU 40 at step SP2 recognizes the memory card 11 connected, and performs a mount process such that the CPU 40 can manage the memory card 11 as part of its own file system, i.e. its own data storage medium. The CPU 40 then proceeds to next step SP3.

Specifically, in this mount process, the memory card 11 is incorporated into a tree structure of directories on the disc camcorder 1 such that the CPU 40 can use the memory card 11 as storage resource. By contrast, in an unmount process, the memory card 11 is separated from the tree structure of directories such that users can eject the memory card 11 without damaging data stored in the memory card 11.

The CPU 40 at step SP3 reads out from the memory card 11 various information (such as important metadata MD1 and information about the amount of free space on the memory card 11). The CPU 40 then copies the information read from the memory card 11 onto an internal Random Access Memory (RAM), and subsequently proceeds to next step SP4.

Since all contents stored in the memory card 11 have been copied at step SP3, the CPU 40 at step SP4 performs the unmount process for the memory card 11, and then proceeds to next step SP5.

In this manner, when the CPU 40 recognizes that the memory card 11 is connected to the disc camcorder 1, the CPU 40 immediately performs the mount process to copy important contents from the memory card 11 to the disc camcorder 1. And when the copy process is completed, the CPU 40 performs the unmount process. This prevents data stored in the memory card 11 from being damaged even if users carelessly eject the memory card 11 from the camera main unit 4.

By the way, the disc camcorder 1 starts a process of recording the high-resolution main-line video data D2 on the optical disc 10, when users perform operation to start shooting objects through the CCD camera 2. The CPU 40 at step SP5 checks whether or not the process of recording is started. The CPU 40 proceeds to step SP6 only when affirmative result is obtained at step SP5.

By the way, a Light Emitting Diode (LED) is disposed at a certain position of the camera main unit 4. When starting the process of recording the high-resolution main-line video data D2 on the optical disc 10, the CPU 40 switches on the LED indicating that the process of recording is now going on.

Since the CPU 40 starts recording the high-resolution main-line video data D2, which was generated based on the material data D1, on the optical disc 10, the CPU 40 at step SP6 again performs the mount process to recognize the memory card 11 as part of its file system. This allows the CPU 40 to record the low-resolution proxy image data D3, the metadata MD1 and the like on the memory card 11. The CPU 40 subsequently proceeds to next step SP7.

The CPU 40 at step SP7 stores the proxy image data D3, the metadata MD1 and the like in the mounted memory card 11, and then proceeds to next step SP8. In this manner, when the CPU 40 starts the process of recording the main-line video data D2 on the optical disc 10, this triggers the mount process. However, there is a possibility that the CPU 40 may have to store data in the memory card 11 before performing this mount process.

Therefore, the CPU 40 temporarily stores in the memory 25 the proxy image data D3 to be stored in the memory card 11, before performing the mount process. Similarly, the CPU 40 temporarily stores the metadata MD1, the audio data D10 and the compressed audio data D11 in the memory 39, the memory 33 and the memory 35, respectively. The CPU 40 also temporarily stores the voice memo data D12 in the memory 38. Then, the CPU 40 controls the second file manager 30 to transfer the temporarily stored data via the memory interface 31 to the memory card 11 at high speed, as if the CPU 40 starts this transfer process after starting the mount process.

The CPU 40 at step SP8 checks whether or not the process of recording the main-line video data D2 on the optical disc 10 is completed. When negative result is obtained at step SP8, the CPU 40 returns to step SP7 to continue the process of recording. The CPU 40 proceeds to next step SP9, when affirmative result is obtained at step SP8.

There may be no data to be stored in the memory card 11, when the process of recording the main-line video data D2 on the optical disc 10 is completed. Therefore, the CPU 40 at step SP9 closes the files of the memory card 11, and performs the unmount process. The CPU 40 then proceeds to next step SP10 to end the mount-control process.

(4) Operation and Effect

The disc camcorder 1 with the above configuration records all the data (including the high-resolution main-line video data D2 generated based on the material data D1) on the removable optical disc 10. Recording the data on the optical disc 10 allows users to preserve these data and to transfer these data to other places. The disc camcorder 1 also records all the data except the main-line video data D2 on the removable memory card 11. Recording the data on the memory card 11 allows users to immediately start using these data.

Figure 5:
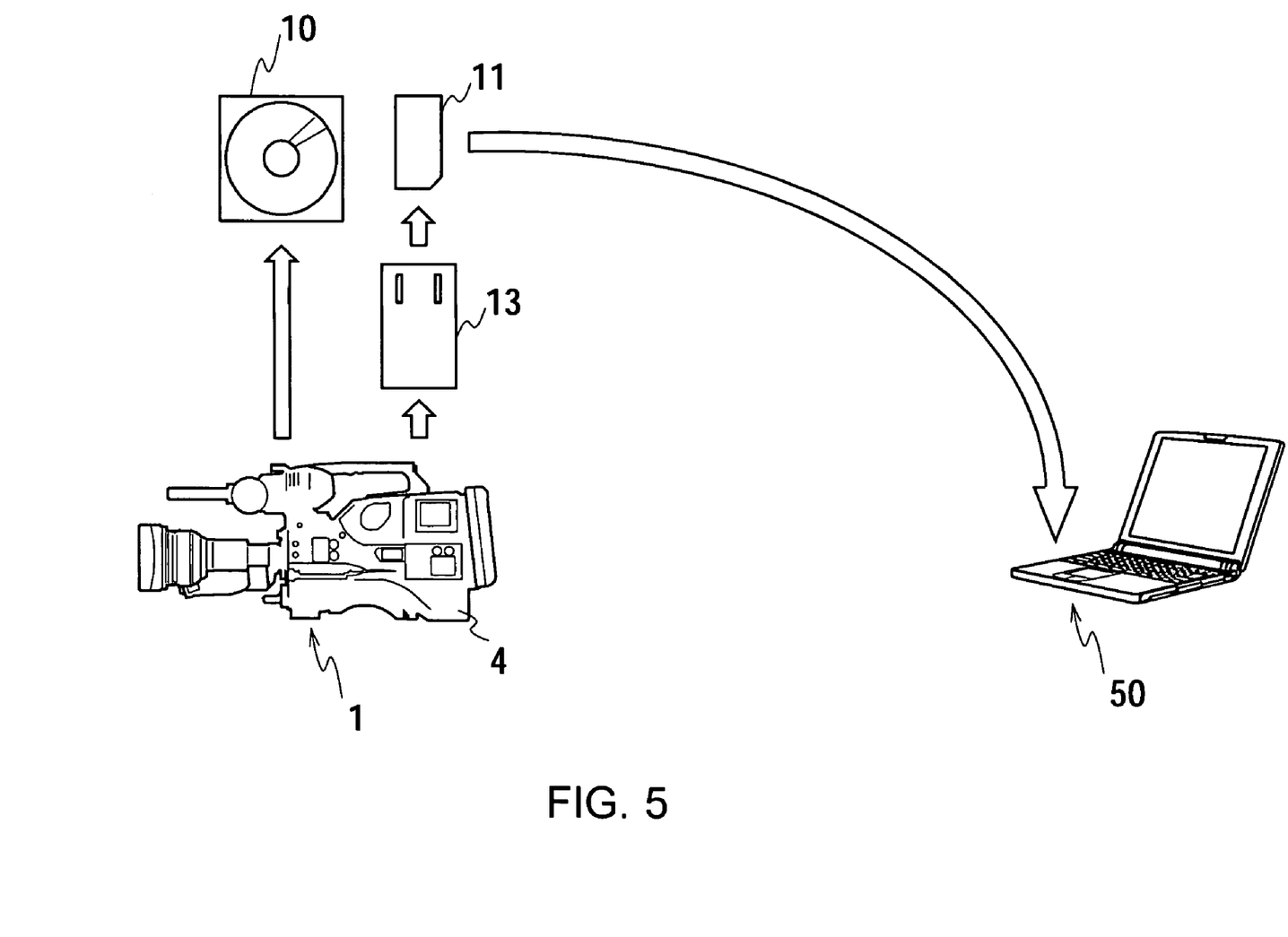
FIG. 5 is a schematic diagram illustrating an example of application.

For example, there is a case in which a user wants to start editing as soon as completing the recording on the optical disc 10. In this case, as shown in FIG. 5, he/she ejects the memory card 11 from the camera main unit 4, and reads out data from the memory card 11 using a notebook type personal computer (also referred to as a "note PC") 50 on the set. In this manner, he/she can read out the proxy image data D3, the metadata MD1 and the like from the memory card 11, and edit them on the spot.

If wireless (or wired) means was used between the disc camcorder 1 and the note PC 50, possible errors could occur while transferring data from the disc camcorder 1 to the note PC 50. However, in this embodiment, the removable memory card 11 is directly connected to the note PC 50 to transfer data from the disc camcorder 1 to the note PC 50. This helps users transfer data accurately, and edit data correctly.

As described above, the note PC 50, which is not connected to the disc camcorder 1, receives the proxy image data D3 from the disc camcorder 1 through the memory card 11, and then edits the proxy image data D3. That is to say, the note PC 50 does not directly access large size of data such as the main-line video data D2. This prevents the main-line video data D2 from being damaged while editing on the note PC 50.

On the other hand, the disc camcorder 1 does not have to play the memory card 11 on the set. As soon as the optical disc 10 is exchanged for a new one, the disc camcorder 1 can start recording the high-resolution main-line video data D2 on the new optical disc 10. This prevents users from losing a perfect opportunity to shoot. This also prevents users from wasting time, because he/she can use the disc camcorder 1 as soon as the optical disc 10 is exchanged. In addition, this allows users to effectively use the provided functions of the disc camcorder 1. Therefore, users can use the disc camcorder 1 more efficiently.

Thus, a user does not have to purchase additional disc camcorders 1, but nonetheless will be able to capture perfect moments. And this helps users reduce costs.

The disc camcorder 1 is designed to be easily connected and disconnected to the memory card 11 just by inserting and ejecting the memory card 11. Therefore, there is a possibility that a user accidentally ejects the memory card 11 while the disc camcorder 1 is writing data on the memory card 11.

Accordingly, the disc camcorder 1 being connected to the memory card 11 mounts a file system of the memory card 11 only while copying from the memory card 11 various information such as the important metadata MD1 and information about the amount of free space on the memory card 11, and writing the proxy image data D3 and the metadata MD1 to the memory card 11.

In this manner, the disc camcorder 1 does not always mount the memory card 11 even if it is being connected to the memory card 11. While the disc camcorder 1 is not reading and writing to the memory card 11, the disc camcorder 1 unmounts the memory card 11. This prevents data stored in the memory card 11 from being damaged, even if a user accidentally ejects the memory card 11.

It is really rare that a user ejects the memory card 11 immediately after he/she inserts it into the disc camcorder 1. It is also rare that a user ejects the memory card 11 while shooting (i.e. while recording the main-line video data D2 on the optical disc 10). There is a rather high possibility that the memory card 11 is accidentally ejected in any other time when the disc camcorder 1 unmounts the memory card 11. Therefore, the disc camcorder 1 can prevent data stored in the memory card 11 from being damaged.

Due to the configuration described above, the disc camcorder 1 records all the data including the main-line video data D2 on the removable optical disc 10 for transfer and preservation of the data. The disc camcorder 1 records all the data except the main-line video data D2 on the removable memory card 11 for immediate use. Therefore, a user can directly bring the optical disc 10 to broadcast stations after ejecting it from the camera main unit 4. In addition, a user can start shooting immediately after exchanging the optical disc 10 for a new one. Further, a user can edit the proxy image data D3 and the metadata MD1 as soon as he/she finishes a shoot on the set.

In addition, the disc camcorder 1 being connected to the memory card 11 mounts the file system of the memory card 11 only while performing certain processes to the memory card 11. Otherwise, the disc camcorder 1 unmounts the file system of the memory card 11. This prevents data stored in the memory card 11 from being damaged, even if a user accidentally ejects the memory card 11 from the camera main unit 4. By the way, in the above-noted embodiments, the disc camcorder has been described as recording apparatus. The recording apparatus also includes other devices such as a video recorder that does not have a shooting function.

(5) Other Embodiments

In the above-noted embodiments, the disc camcorder 1 records all the data including the main-line video data D2 on the optical disc 10, and records all the data except the main-line video data D2 on the memory card 11. However, the present invention is not limited to this. The disc camcorder 1 may record the main-line video data D2 and/or the audio data D10 on the memory card 11 for a certain period of time for confirmation. This allows users to check the actual quality of pictures and sounds based on the main-line video data D2 while editing data stored in the memory card 11.

In the above-noted embodiments, the high-resolution main-line video data D2 are recorded on the optical disc 10 after being compressed and encoded in MPEG2 format. The low-resolution proxy image data D3 are recoded on the memory card 11 after being compressed and encoded in MPEG4 format. However, the present invention is not limited to this. The main-line video data that have been shot in High Definition (HD) may be recorded on the optical disc 10. In addition, the proxy image data that have been shot in Standard Definition (SD) may be recorded on the memory card 11. That is to say, the high-resolution main-line video data may be recorded on the optical disc 10 for transfer and preservation.

The low-resolution proxy image data may be recorded on the memory card 11 for immediate use.

In the above-noted embodiments, the memory card 11 has been described as a data storage medium. However, the present invention is not limited to this. The data storage medium may include various media such as a memory card type hard disk drive, which can be connected to a PC card slot; a "COMPACT FLASH (Registered Trademark)"; and a "SMART MEDIA (Registered Trademark)". These removable media may be connected to a certain position of the camera main unit 4 through the camcorder adapter 13.

Figure 6:
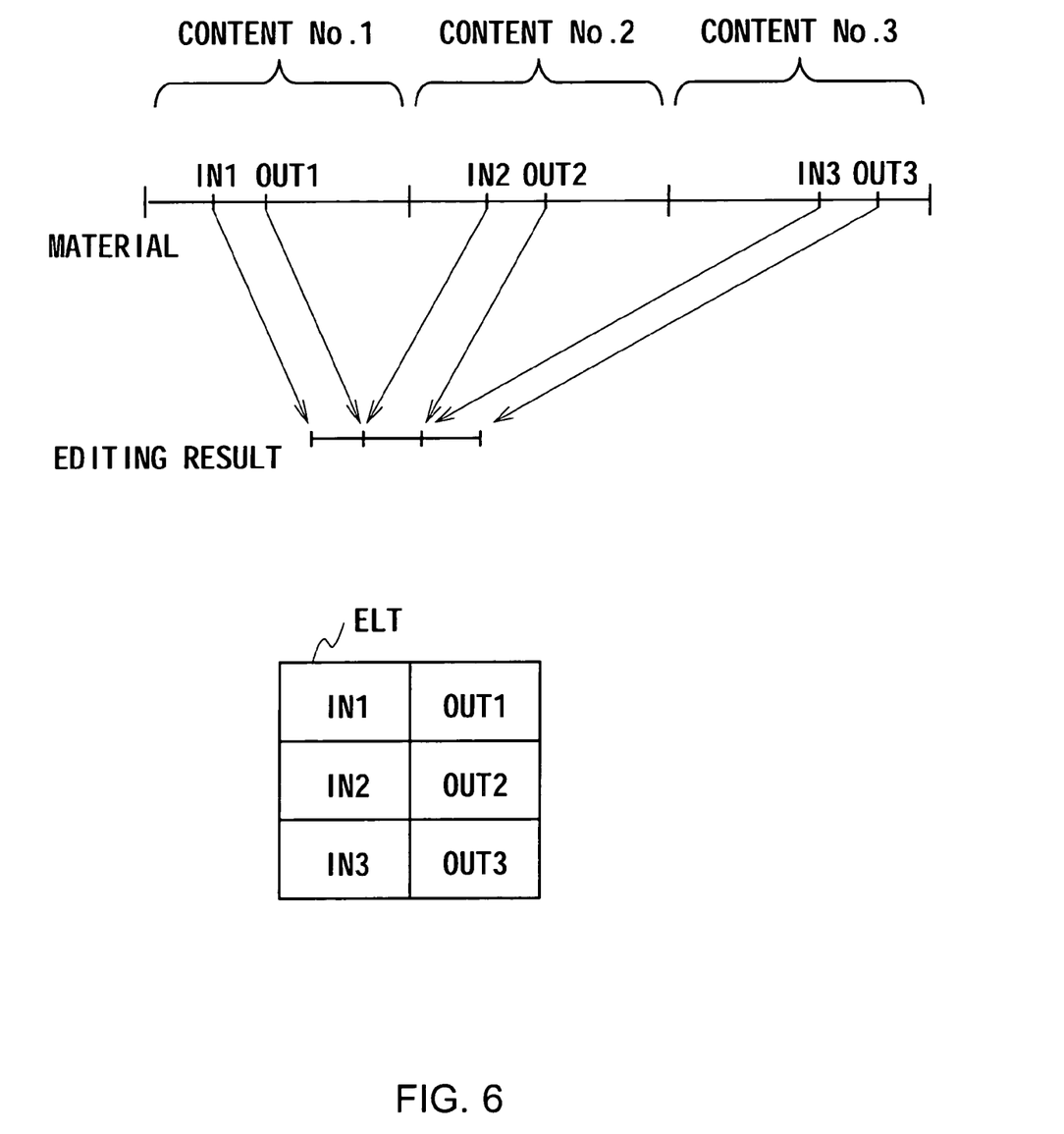
FIG. 6 is a schematic diagram illustrating a edit list.

In the above-noted embodiments, the disc camcorder 1 records the proxy image data D3, the metadata MD1 and the like on the memory card 11. However, the present invention is not limited to this. As shown in FIG. 6, the disc camcorder 1 may reads out an edit list ELT from the memory card 11 as metadata. For example, the edit list ELT specifies important parts of content data No. 1 to No. 3 using time codes (i.e. IN1 through OUT1, IN2 through OUT2, and IN3 through OUT3). The disc camcorder 1 may follow the edit list ELT to extract the important parts from these content data (equivalent to the main-line video data D2), and read out them from the optical disc 10 as editing-result data. The disc camcorder 1 may record the editing-result data again on the optical disc 10.

In the above-noted embodiments, the CPU 40 (control means) mounts the file system of the memory card 11 at the time when the memory card 11 is connected. Also, the CPU 40 mounts the file system of the memory card 11 while writing the main-line video data D2 to the optical disc 10. Otherwise, the CPU 40 unmounts the file system of the memory card 11. However, the present invention is not limited to this. The CPU 40 may mount the memory card 11 while writing the voice memo data D12 to the memory card 11. In this case, the disc camcorder 1 may temporarily store the voice memo data D12 in the memory 38 before that. And then the disc camcorder 1 may transfer the voice memo data D12 from the memory 38 to the memory card 11 after mounting the memory card 11.

The recording apparatus and mount-control method according to an embodiment of the present invention for example can be applied to not only camcorders for broadcast stations but also consumer video cameras.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
   a drive section configured to drive a recording medium on which image data is recorded;
   a connection section configured to connect a data storage medium to the recording apparatus, said data storage medium being different from said recording medium; and
   a control section configured to mount and unmount said data storage medium while said data storage medium is connected to said connection section, said control section configured to:
   mount said data storage medium when said data storage medium is connected to said connection section,
   unmount said data storage medium without receiving a user input after reading out a part of data from said data storage medium,
   temporarily store image data to be stored on the data storage medium in a memory of the recording apparatus before the data storage medium is remounted,
   remount said data storage medium when a process of recording the image data on said recording medium starts, and
   store the image data on the data storage medium which was temporarily stored in the memory of the recording apparatus after the data storage medium is remounted.

2. The recording apparatus according to claim 1, wherein said control section reads out metadata from said data storage medium when said control section detects that said data storage medium is connected to said connection section and said data storage medium is mounted.

3. The recording apparatus according to claim 1, wherein said control section remounts said data storage medium when the process of recording the image data on said recording medium starts, and then records reference video signals on said data storage medium, said reference video signals being generated based on said image data.

4. The recording apparatus according to claim 1, wherein said control section is further configured to
   read out editing information relevant to said image data from said data storage medium connected to said connection section,
   edit said image data based on said stored editing information, and
   output edited result data.

5. The recording apparatus according to claim 1, wherein said control section is further configured to incorporate said data storage medium into a tree structure of directories on said recording apparatus when mounted, said data storage medium being used as a storage device by said recording apparatus.

6. The recording apparatus according to claim 1, wherein said control section is further configured to copy part of data read from said data storage medium onto an internal random access memory (RAM) of said recording apparatus.

7. The recording apparatus according to claim 1, wherein said control section is further configured to copy from the storage medium a value indicating an amount of free space on the storage medium.

* * * * *